United States Patent [19]

Kuramitsu et al.

[11] Patent Number: 5,082,435
[45] Date of Patent: Jan. 21, 1992

[54] TRANSFERRING AND MOLDING APPARATUS

[75] Inventors: Mikihiro Kuramitsu, Funabashi; Junichi Kabasawa; Nobuhisa Watanabe, both of Tokyo, all of Japan

[73] Assignee: Yoshida Industry Co., Ltd., Tokyo, Japan

[21] Appl. No.: 458,375

[22] Filed: Dec. 28, 1989

[30] Foreign Application Priority Data

Jun. 23, 1989 [JP] Japan .................. 1-159707
Jun. 23, 1989 [JP] Japan .................. 1-159708

[51] Int. Cl.$^5$ .................. B29C 39/12; B29C 45/14; B29C 45/16
[52] U.S. Cl. .................. 425/117; 425/126.1; 425/127; 425/135; 425/553
[58] Field of Search .............. 264/509, 40, 40.1, 40.7; 425/116, 117, 122, 126.1, 129.1, 145, 135, 123, 127, 150, 553; 156/540, 541, 230, 361; 242/57, 75.51; 72/420

[56] References Cited

U.S. PATENT DOCUMENTS

| | | | |
|---|---|---|---|
| 2,811,744 | 11/1957 | Baldanza | 425/127 |
| 3,324,508 | 6/1967 | Dickinson | 425/126.1 |
| 3,632,252 | 1/1972 | Amberg | 264/509 |
| 3,673,473 | 6/1972 | Werner | 242/75.51 |
| 3,743,458 | 7/1973 | Hallauer et al. | 425/112 |
| 3,801,689 | 4/1974 | Langecker | 264/509 |
| 3,848,528 | 11/1974 | Seedorf | 101/196 |
| 4,213,583 | 7/1980 | Mitani et al. | 242/75.51 |
| 4,360,329 | 11/1982 | Hatakeyama | 425/126.1 |
| 4,369,157 | 1/1983 | Conner | 425/129.1 |
| 4,383,880 | 5/1983 | Geurtsen et al. | 156/542 |
| 4,459,170 | 7/1984 | Kerwin | 156/361 |
| 4,545,752 | 10/1985 | Hanamoto et al. | 425/126.1 |
| 4,639,341 | 1/1987 | Hanamoto et al. | 264/509 |
| 4,795,597 | 1/1989 | Whiteley et al. | 425/126.1 |
| 4,853,169 | 8/1989 | Kaminski | 425/126.1 |
| 4,861,541 | 8/1989 | Kaminski et al. | 425/126.1 |
| 4,872,825 | 10/1989 | Ross | 425/117 |
| 4,897,230 | 1/1990 | Gross | 425/145 |

FOREIGN PATENT DOCUMENTS

| | | | |
|---|---|---|---|
| 0220717 | 11/1985 | Japan | 425/122 |
| 1249733 | 11/1986 | Japan | 425/150 |
| 3147623 | 6/1988 | Japan | 425/122 |

Primary Examiner—Willard Hoag
Attorney, Agent, or Firm—Wenderoth, Lind & Ponack

[57] ABSTRACT

A transfer and molding apparatus for transferring an image or pattern from an elongate transfer film to a molded article. The transferring and molding apparatus includes a film feed-out mechanism for feeding the transfer film wound around a supply drum and introducing the transfer film between a stationary mold member and a movable mold member and a film take-up mechanism for taking up the transfer film positioned between the stationary mold member and the movable mold member onto a take-up drum. A longitudinal direction feeding device has a controlling motor for feeding the transfer film in a longitudinal direction thereof from the film feed-out mechanism toward the film take-up mechanism by a predetermined length during each molding cycle, and a longitudinal direction sensor for detects a position setting mark on the transfer film. When the mold is open to separate the stationary and movable mold members, the controlling motor is rotated at a high speed until immediately before an amount of the transfer film being fed reaches a predetermined value and thereafter it is switched to a low speed. Then when the longitudinal direction sensor detects the position setting mark, the controlling motor is once stopped, and thereafter the controlling motor is further rotated by a preset rotational angle.

16 Claims, 6 Drawing Sheets

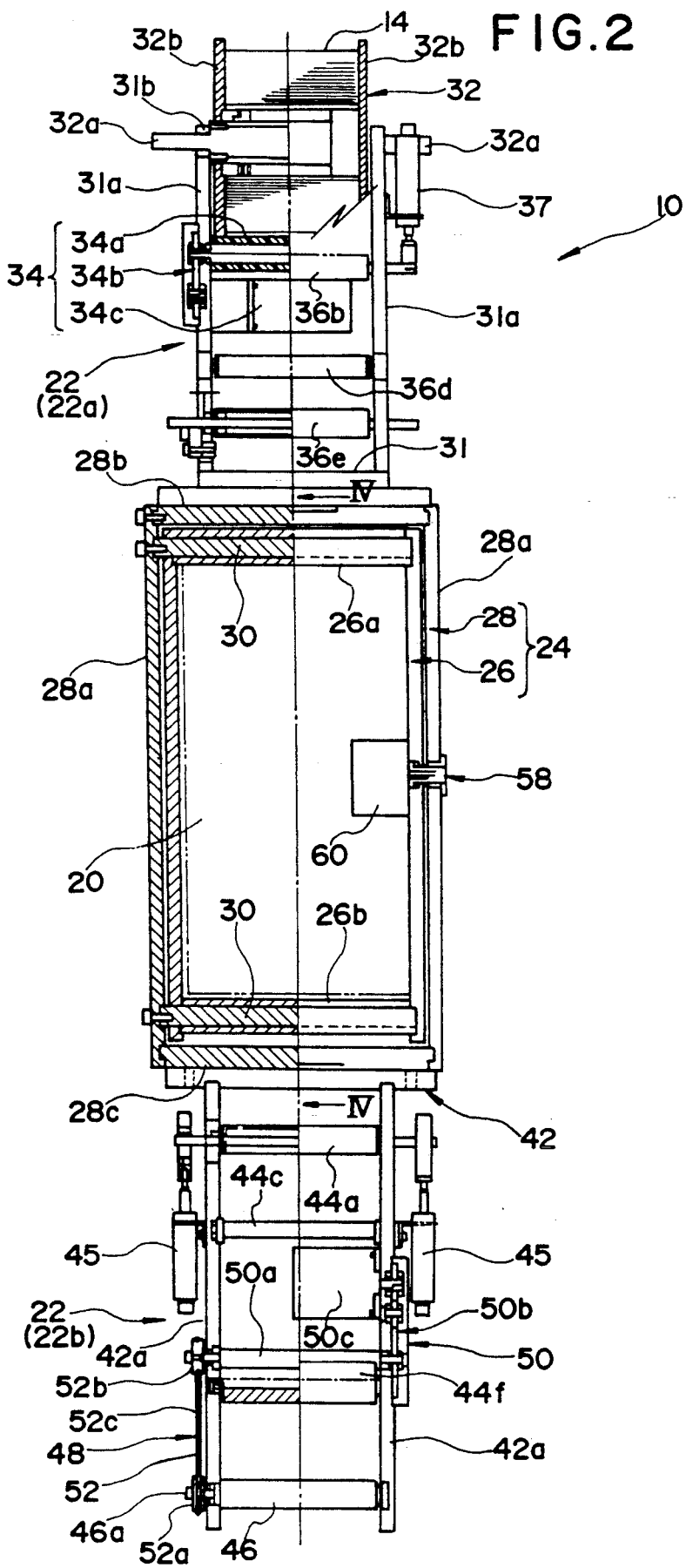

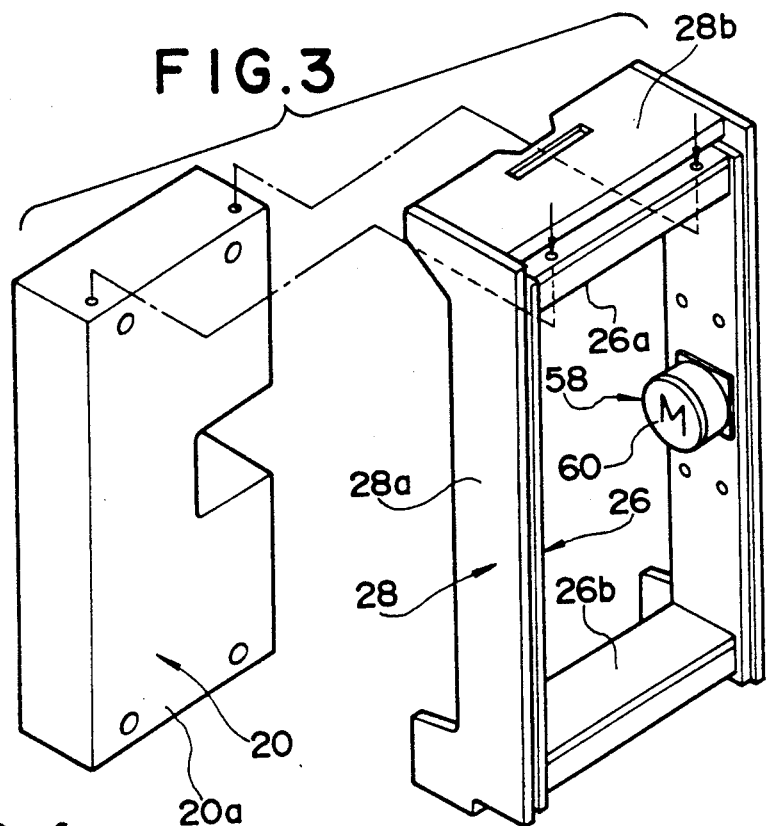
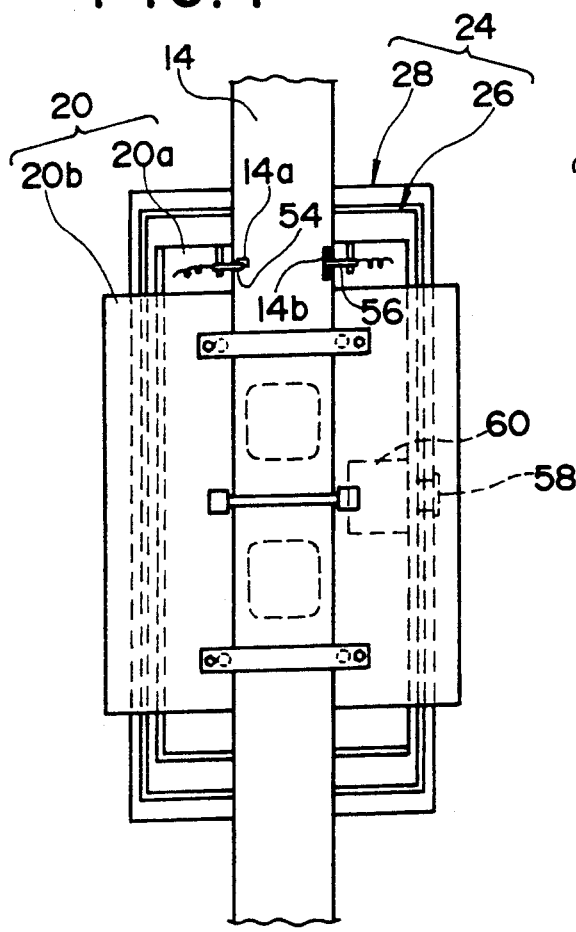
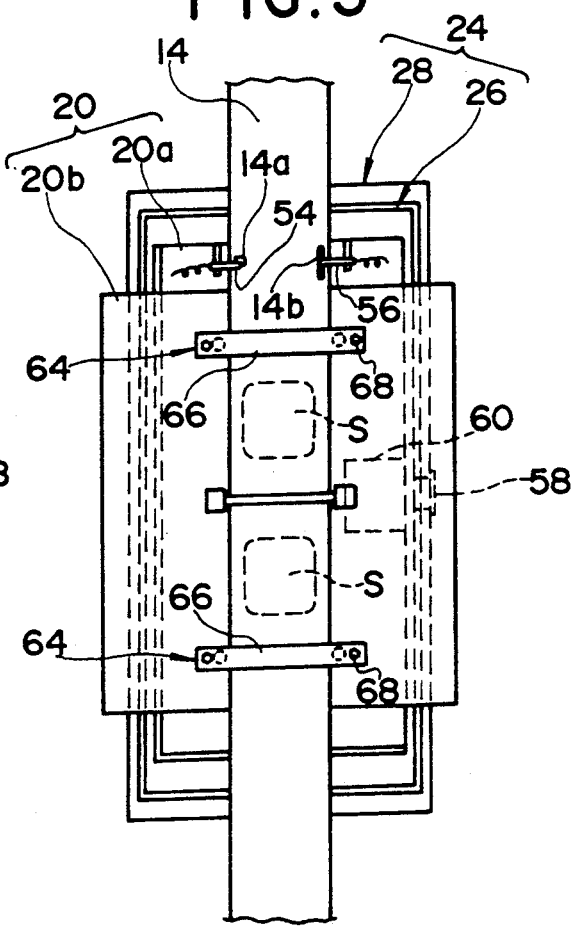

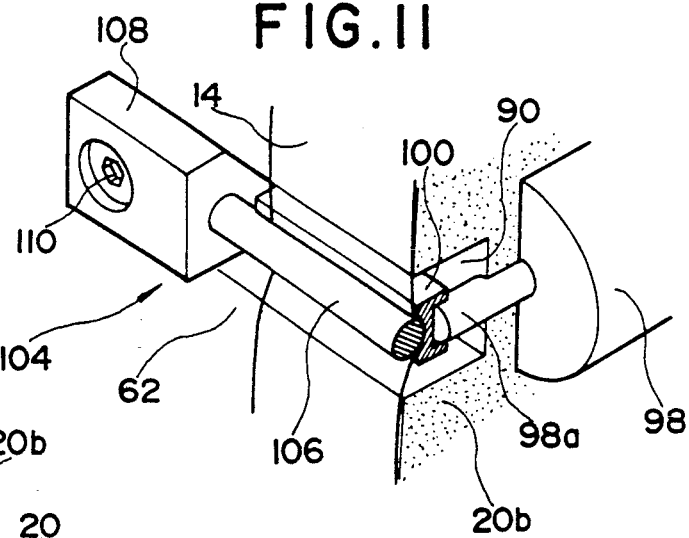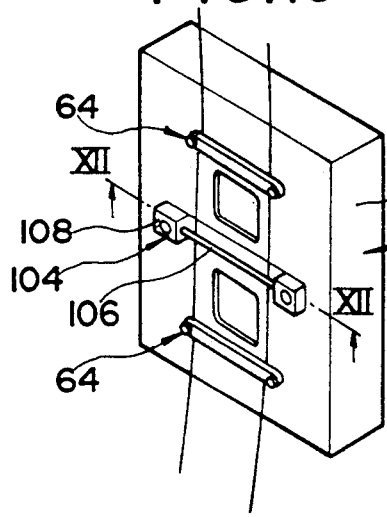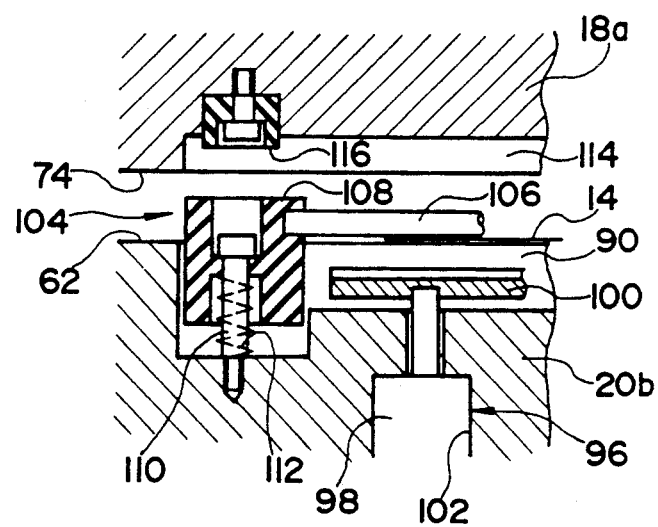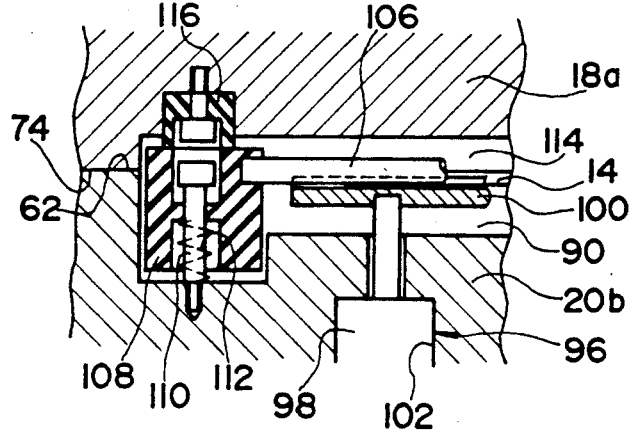

TRANSFERRING AND MOLDING APPARATUS

BACKGROUND OF THE INVENTION

The present invention relates to a transferring and molding apparatus for transferring an image or pattern printed in advance on an elongate transfer film onto a molded article, and more particularly to a transferring and molding apparatus in which the transfer film is introduced and sandwiched between a stationary mold member and a movable mold member in an injection mold, thereby transferring the image or the pattern on the transfer film onto the molded article while an injection molding operation is conducted.

A transferring and molding apparatus of this type is disclosed in, for example, Japanese Patent Publication No. 60-59128. Such transferring and molding apparatus comprises a frame mounted on a movable base in an injection mold and movable in a width direction of the transfer film, a width direction moving device for moving the frame to a certain position in the width direction, a feed roller and a tension roller provided on the frame, a longitudinal direction moving device for moving the transfer film in a longitudinal direction by rotating the feed roller, and longitudinal direction and width direction sensors for detecting respective longitudinal direction and width direction marks on the transfer film. In the longitudinal direction moving device, the transfer film is fed at a high speed to a predetermined position immediately before a stop position in the longitudinal direction. When the longitudinal direction sensor detects that the transfer film reaches the predetermined position, the feeding speed is switched to a low speed. Thereafter, when the longitudinal direction sensor detects that the transfer film reaches the stop position, the longitudinal direction moving device is stopped and the transfer film accordingly also is stopped.

Accordingly, in such transferring and molding apparatus, if the longitudinal direction sensor is accurately positionally adjusted so that a reference line of the article molding portion of the mold and a reference line of the transfer film are aligned within an allowable margin of error, the image or pattern can be transferred onto the surface of the molded article with increased accuracy.

However, the transfer film is a continuous elongate roll of film, and the relative position between the image or pattern printed in advance on the transfer film and the longitudinal direction mark is different for different manufacturing lots of the transfer film. Further, if the molded articles are changed and the transfer films to be employed are different types, each relative position between the image or pattern on the transfer film and the longitudinal direction mark is different depending on the type of transfer film.

Therefore, in the conventional transferring and molding apparatus in which when the longitudinal direction sensor detects that the longitudinal direction mark reaches the stop position and the longitudinal direction moving device is stopped, when a different manufacturing lot of the transfer film is used upon replacing the supply drum, or when the molded article is changed, the position of the longitudinal direction sensor again must be accurately adjusted. However, since such position adjustment of the longitudinal direction sensor must be effected by moving the longitudinal sensor little by little while repeating injection molding trials, such adjustment operation is extremely troublesome and difficult.

Further, there has been proposed another type of transferring and molding apparatus, as disclosed in Japanese Publication No. 63-67456. This transferring and molding apparatus is provided with a clamp member and a clamp receiving member which are disposed at a position where a stationary base and a movable base are in confrontation with each other, and which interpose the transfer film introduced between the stationary mold member and the movable mold member, the clamp member and the clamp receiving member each having a surface parallel to the transfer film. The clamp member is axially movable and can apply pressure to the clamp receiving member by a pressing device. The pressure generated by the pressing device is arranged to be larger than the tension in the transfer film generated at the time when the transfer film is sandwiched in a molding space of the stationary and movable mold members. Therefore, this conventional apparatus is arranged so that the transfer film can be clamped by the clamp member and the clamp receiving member when the mold is closed, before the transfer film is sandwiched in the molding space of the stationary and movable mold members, to thus restrain the transfer film firmly by the pressing device. Accordingly, with this clamped state, even if the transfer film is sandwiched in the molding space of the stationary and movable mold members, since the restraining force of the pressing device is larger than the tension generated in the transfer film, the transfer film can be prevented from swerving from a regular position.

However, in the above conventional apparatus, since the transfer film is sandwiched in the molding space of the stationary and movable mold members while the transfer film is firmly clamped by the clamp member and the clamp receiving member, excess tension is generated in the transfer film to thus cause deformation such as elongation. Accordingly, the image or pattern on the molded article may be distorted and impaired.

SUMMARY OF THE INVENTION

It is an object of the present invention to provide a transferring and molding apparatus which is capable of setting and adjusting the stop position in a longitudinal direction of the transfer film with increased accuracy without moving the longitudinal direction sensor, even if a different manufacturing lot is used upon replacing the transfer film, or if the molded article is changed.

Another object of the present invention is to provide a transferring and molding apparatus which can prevent generation of excess tension in the transfer film and can prevent the image or pattern on the molded article from being distorted when the transfer film is sandwiched in a molding space of the stationary and movable mold members, and which can precisely position the image or pattern on the transfer film and transfer it onto a regular position of the molded article.

According to a first aspect of the present invention, there is provided a transferring and molding apparatus for transferring an image or pattern on an elongate transfer film to a molded article by introducing the transfer film between a stationary mold member and a movable mold member in a mold and holding the transfer film between the stationary and movable mold members simultaneously with injection molding. The transferring and molding apparatus includes a film feed-out mechanism provided at an upstream side of the mold in a film feeding direction for feeding the transfer film wound around a supply drum and introducing the transfer film between the stationary mold member and the movable mold member, a film take-up mechanism provided at a downstream side of the mold in the film feeding direction for taking up the transfer film positioned between the stationary mold member and the movable mold member onto a take-up drum, a longitudinal direction feeding means for feeding the transfer film in a longitudinal direction thereof from the film feed-out mechanism toward the film take-up mechanism by a predetermined length during each molding cycle, the longitudinal direction feeding means having a first controlling motor, and a longitudinal direction sensor for detecting a position setting mark on the transfer film. When the mold is open to separate the stationary and movable mold members, the first controlling motor is rotated at a high speed until immediately before an amount of the transfer film being fed reaches a predetermined value and thereafter it is switched to a low speed. Then, when the longitudinal direction sensor detects the position setting mark, the first controlling motor is once stopped, and thereafter the first controlling motor is further rotated by a present rotational angle.

With this structure, when the mold is open to separate the stationary and movable mold members, the first controlling motor is rotated at a high speed until immediately before the amount of the transfer film being fed reaches the predetermined value and thereafter the first controlling motor is switched to and rotated at the low speed. Meanwhile, as the transfer film is fed from the feed-out mechanism to the take-up mechanism, a post-transfer film portion between the stationary and movable mold members is drawn out therefrom and a pre-transfer film portion is introduced therebetween. When the longitudinal direction sensor detects the position setting mark on the transfer film, the first controlling motor is once stopped. Taking this stop position as a reference position, the first controlling motor is further rotated by a preset rotational angle from the reference position, thereby positioning a predetermined longitudinal position of an image or a pattern on the transfer film.

According to a second aspect of the present invention, there is provided a transferring and molding apparatus for transferring an image or pattern on an elongate transfer film to a molded article by introducing the transfer film between a stationary mold member and a movable mold member in a mold and holding the transfer film between the stationary and movable mold members simultaneously with injection molding. The transferring and molding apparatus includes first engaging means provided on a separating surface of the movable member and positioned above the transfer film path and adjacent to a article molding portion for nipping the transfer film in cooperation with the separating surface when closing the mold, and for holding the transfer film on the movable member when opening the mold, the first engaging means being movable toward and away from the separating surface so as to engage with the transfer film;. Pressing means is provided on the stationary mold member for contacting the engaging means and pressing the engaging means against the separating surface while the mold is being closed, and for allowing the transfer film to slide into an article molding portion when closing the mold.

With this structure, when closing of the mold is started, the first engaging means provided on the separating surface of the movable mold member is brought into contact with pressing means provided on the stationary mold member, and the first engaging means is pressed against the separating surface before closing of the mold finishes. When the transfer film is being sandwiched in the article molding portions of the stationary and movable mold members, the transfer film is slidingly moved against the pressing force between the engaging means and the separating surface. At that time, the transfer film is equally pulled into the article molding portions from both upstream and downstream sides of the feeding path, the image or pattern on the transfer film is positioned at a regular position, and excess tension is not acted on imported to the transfer film.

On the other hand, when opening of the mold is started, the transfer film adheres to the surface of the molded article. While the movable mold member is being moved away from the stationary mold member, the molded article remains in the stationary mold member. Meanwhile the transfer film is quickly and smoothly detached from the molded article, since the transfer film is engaged with the first engaging means at a position close to the molded article and is moved away from the stationary mold member together with the movable mold member.

In an apparatus having a plurality of article molding portions, a second engaging means provided between two article molding portions is engaged with the transfer film when the mold is open, and the transfer film can be more smoothly detached from the molded article.

In a further arrangement the transfer film is firmly fixed by fixing means and the second engaging means at the portion between two article molding portions. Therefore, when the transfer film is pulled into the article molding portions upon closing of the mold, the transfer film is pulled into the article molding portions positioned in a manner such that the transfer film portions positioned at upstream and downstream sides of the fixed portion are slidingly moved toward the fixed portion. As a result, the images or patterns on the transfer film are precisely positioned at respective regular positions. This positioning feature is effectively applicable to the multiple manufacturing type apparatus which can mold a plurality of different shaped molded articles simultaneously.

The above and other objects, features and advantages of the present invention will become more apparent from the following description when taken in conjunction with the accompanying drawings in which preferred embodiments of the present invention are shown by way of illustrative examples.

BRIEF DESCRIPTION OF THE DRAWINGS

In the drawings:

FIG. 2 is a transverse cross-sectional view of the transferring and molding apparatus of the first embodiment;

FIG. 3 is a perspective view showing a molding plate and a box frame of a movable mold member in the first embodiment;

FIG. 4 is a side view as viewed from line IV—IV of FIG. 1;

FIG. 5 is a side view showing a transferring and molding apparatus in a second embodiment which pertains to an improvement on the first embodiment as shown in FIG. 4;

FIGS. 10 through 12 (B) illustrate a modified embodiment showing engaging means, FIG. 10 being a respective view showing the article molding portion of the movable mold member, FIG. 11 being a perspective view showing engaging means and pressing means, and FIGS. 12 (A) and 12 (B) being cross-sectional views taken along line XII—XII of FIG. 10 and showing operation of engaging means and pressing means, and also showing the stationary mold member corresponding to the movable mold member.

DETAILED DESCRIPTION OF THE PREFERRED EMBODIMENTS

A transferring and molding apparatus 10 according to a first embodiment of the present invention will be described below with reference to FIGS. 1 through 4.

Figure 1:
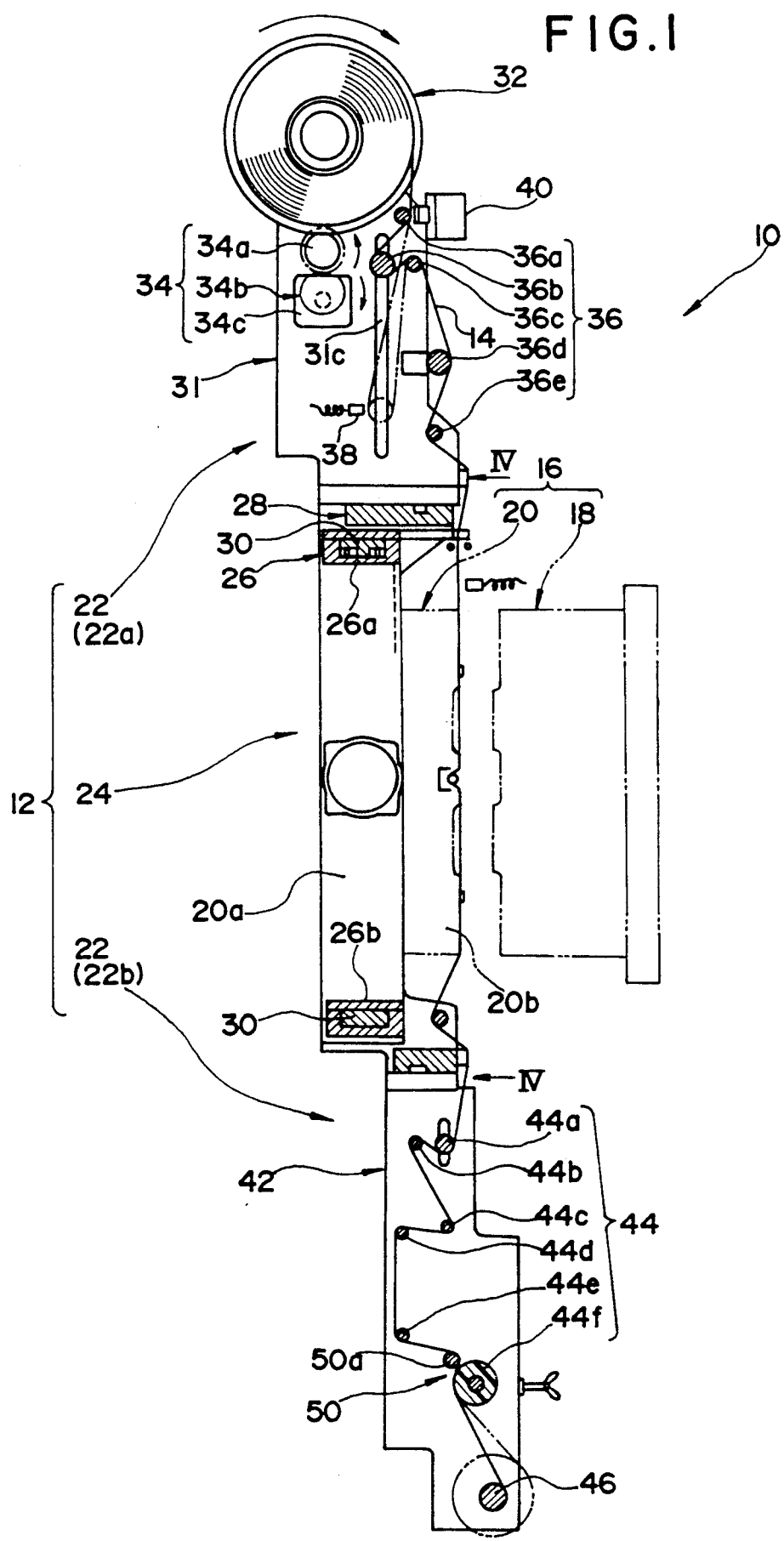
FIG. 1 is a schematic cross-sectional view showing a transferring and molding apparatus according to a first embodiment of the present invention.

The transferring and molding apparatus 10 is provided with a transfer film feeding device 12 disposed adjacent to an injection mold 16 which comprises a stationary mold member 18 and a movable mold member 20 as shown in FIGS. 1 and 2. The transfer film feeding device 12 mainly comprises a film feeding mechanism 22 for introducing a transfer film 14 from an upper side of the injection mold 16 between the stationary mold member 18 and movable mold member 20 and feeding out the transfer film 14 from a lower side of the injection mold 16, and a box frame 24 for supporting the film feeding mechanism 22. The box frame 24 comprises an inner box frame 26 and an outer box frame 28 each having a rectangular shape, the outer box frame 28 enclosing an outer periphery of the inner box frame 26 as shown in FIGS. 3 and 4. The inner box frame 26 has an upper crossbar 26a and a lower crossbar 26b each having a hollow rectangular section. Slidable rods 30 each having a solid rectangular section are inserted into the upper and lower crossbars 26a, 26b respectively. Each slidable rod 30 has opposite ends which are fixedly secured to side plates 28a of the outer box frame 28, to thereby allow the outer box frame 28 to move horizontally back and forth relative to the inner box frame 26 along a width direction of the transfer film 14 as shown in FIG. 2. On the other hand, the inner box frame 26 is fixedly secured to a molding plate 20a of the movable mold member 20 through bolts or the like.

The film feeding mechanism 22 comprises a film feed-out mechanism 22a integrally provided on an upper side plate 28b of the outer box frame 28, and a film take-up mechanism 22b integrally provided on a lower side plate 28c of the outer box frame 28. The film feed-out mechanism 22a includes a substantially U-shaped frame 31 fixedly secured to the upper side plate 28b of the outer box frame 28 and having an upper open end, and a supply drum 32 extending over space side plates 31a of frame 31 and detachably rotatably supported on upper end portions thereof. Further, the film feed-out mechanism 22a includes a supply drum driving device 34 for rotating the supply drum 32 and which is disposed below the supply drum 32 and fixedly attached to the substantially U-shaped frame 31, and a plurality of rollers 36 for feeding the transfer film 14 taken out from the supply drum 32 and introducing the transfer film 14 between the stationary mold member 18 and the movable mold member 20. The transfer film 14 in the form of an elongate sheet is wound around the supply drum 32 in advance. The supply drum 32 is mounted on the substantially U-shaped frame 31 by inserting a shaft 32a of the supply drum 32 into vertical slots 31b which are formed at upper portions of the side plates 31a, each slot 31b extending in a vertical direction in the respective side plate 31a and having an upper open end. When the shaft 32a of the supply drum 32 is inserted into the slots 31b, side plates 32b of the supply drum 32 are brought in contact with a capstan roller 34a which is rotatable by a motor 34c through gears 34b. The transfer film 14 taken out from the supply drum 32 is fed and guided by a first idle roller 36a, a tension roller 36b, and second to forth rollers 36c, 36d, 36e which are rotatably supported on the side plates 31a, and is introduced between the stationary mold member 18 and the movable mold member 20. The tension roller 36b is supported in elongate slits 31c formed in the side plates 31a of the substantially U-shaped frame 31 and is movable vertically. When the supply drum 32 is rotated and the transfer film 14 is taken out therefrom, the tension roller 36b descends along the elongate slits 31c due to weight of roller 36b. A limit switch 38 is provided adjacent a lower portion of an elongate slit 31c such that the limit switch 38 detects a predetermined lower position of the tension roller 36b which corresponds to the position where the transfer film 14 has been taken out from the supply drum 32 by the length of one shot (the length necessary for each transfer operation). When the limit switch 38 detects a predetermined lower position of the tension roller 36b, the motor 34c is stopped.

Further, on the substantially U-shaped frame 31, tensioners 37 comprising hydraulic cylinders are provided above the elongate slit 31c (only the righthand tensioner 37 is shown in FIG. 2). The tensioners 37 engage respective opposite end portions of the shaft of the tension roller 36b, such that the tension roller 36b is moved down by appropriate pressing forces of the tensioners 37.

On the other hand, adjacent the first idle roller 36a, there is provided a stopper 40 which is movable to a position toward contact with and to a positioned spared apart from the first idle roller 36a. The transfer film 14 is sandwiched and nipped between the stopper 40 and the first idle roller 36a, with the stopper 40 contacting the first idle roller 36a. Therefore, when the limit switch 38 detects a predetermined lower position of the tension roller 36b, the stopper 40 and the first idle roller 36a nip and hold the transfer film 14 in cooperation with each other. Incidentally, the transfer film 14 is taken out during an injection molding operation.

The film take-up mechanism 22b includes a substantially U-shaped frame 42 fixedly secured to the lower side plate 28c of the outer box frame 28 and having a lower open end, a plurality of rollers rotatably supported on spared side plates 42a of the substantially U-shaped frame 42 for feeding the post-transfer film 14, and a take-up drum 46 extending over both side plates 42a of frame 42 and detachably rotatably supported thereon for taking up the post-transfer film 14. Further, the film take-up mechanism 22b includes a take-up drum driving device similar to supply drum driving device 34 for rotating the take-up drum 46, and a longitudinal direction feeding means 50 for taking out, by the length of one shot, the post-transfer film 14 positioned between the stationary mold member 18 and the movable mold member 20, for introducing pre-transfer film 14 taken out and positioned at the film feed-out mechanism 22a between the stationary mold member 18 and the movable mold member 20, and for positioning the pre-transfer film 14 at a predetermined position. The post-transfer film 14 taken out from between the stationary mold member 18 and movable mold member 20 is fed and guided by a tension roller 44a, and first to fifth idle rollers 44b, 44c, 44d, 44e, 44f which are rotatably supported on the side plates 42a, and is wound around the take-up drum 46.

Tensioners 45 comprising hydraulic cylinders are provided on both side plates 42a of the substantially U-shaped frame 42. The tensioners 45 are engaged with respective opposite end portions of the shaft of the tension roller 44a, and the tension roller 44a is moved down by appropriate pressing forces of the tensioners 45.

Further, a capstan roller 50a is provided adjacent to the fifth idle roller 44f so that the capstan roller 50a is pressed toward the fifth idle roller 44f to nip the post-transfer film therebetween 14. The capstan roller 50a has a shaft which is rotatably supported on the substantially U-shaped frame 42, one end of such shaft being connected to a first controlling motor 50c such as a pulse motor or a servo motor through gears 50b. The first controlling motor 50c is driven during each molding cycle, to thereby feed the post-transfer film 14 by the length of one shot toward the take-up drum 46. The first controlling motor 50c, the gears 50b, the capstan roller 50a and the fifth idle roller 44f jointly constitute the longitudinal direction feeding means 50.

A belt 52c is trained around pulleys 52a, 52b fixed respectively to the shafts of the capstan roller 50a and the take-up drum 46, the belt 52c and the pulleys 52a, 52b jointly providing belt transmitting means 52. The take-up drum 46 is rotated by the belt transmitting means 52, and the post-transfer film 14 fed by the longitudinal direction feeding means 50 is taken up by the take-up drum 46.

As shown in FIG. 4, on the inner box frame 26, there are provided a longitudinal direction sensor 54 for setting the transfer film 14 at a predetermined position in a longitudinal direction and a width direction sensor 56 for setting the transfer film 14 at a predetermined position in a width direction. The longitudinal direction sensor 54 and the width direction sensor 56 detect position setting marks 14a, 14b respectively which are formed on the transfer film 14. The position setting marks 14a, 14b are formed at opposite side edge portions of the transfer film 14 at regular intervals corresponding to the length of one shot.

When the mold 16 is open to separate the stationary mold member 18 and the movable mold member 20, the first controlling motor 50c is rotated at a high speed until immediately before an amount of the transfer film 14 being fed reaches a predetermined value, and thereafter controlling motor 50c is switched to and rotated at a low speed. Then the longitudinal direction sensor 54 detects the position setting mark 14a, the first controlling motor 50c is once stopped and this stop position is regarded as a reference position. Thereafter, the first controlling motor 50c is further rotated by a preset rotational angle from the reference position, and an image or a pattern on the transfer film 14 is positioned at a regular position in the longitudinal direction. At that time, the stopper 40 is moved toward contact with the first idle roller 36a of the film feed-out mechanism 22a, and the transfer film 14 is pressed and nipped between the stopper 40 and the first idle roller 36a. By this time the tension roller 36b has descended to a predetermined lower position, and the length of the transfer film 14 that has been taken out from the supply drum 32 equals the length of one shot. When the post-transfer film 14 is fed toward the take-up drum 46 by rotation of the controlling motor 50c, the tension roller 36b is raised upwardly.

The inner and outer box frames 26, 28 are provided with a width direction position adjusting means 58 for adjusting position of the transfer film 14 in a width direction by changing relative positions of the inner and outer box frames 26, 28. The width direction position adjusting means 58 comprises a second controlling motor 60 such as a pulse motor or a servo motor. To be more specific, a motor body is fixed to an inner side of a side plate of the inner box frame 26, while a tip end of a motor shaft passes through a hole formed in the side plate of the inner box frame 26 and is threaded into the outer box frame 28. That is, since the inner box frame 26 is fixed to the movable mold member 20, when the second controlling motor 60 is rotated, the outer box frame 28 is moved relative to inner box frame 26 and movable mold member 20 in the width direction of the transfer film 14 in an amount in accordance with the rotational angle of the second controlling motor 60 and the thread pitch of the threaded portion. Thereby the entire film feeding mechanism 22 integrally fixed to the other box frame 28 and the film are moved and adjusted in the width direction of transfer film 14 relative to an article molding portion of the movable mold member 20.

The positioning in the width direction of the transfer film 14 is carried out after positioning in the longitudinal direction thereof is carried out. More specifically, after finishing the positioning of the transfer film 14 in the longitudinal direction, the second controlling motor 60 is rotated, the outer box frame 28 is moved in the right-hand direction and viewed in FIG. 4, as a result, the position setting mark 14b on the transfer film 14 is deviated from the width direction sensor 56 entirely. Thereafter, the second controlling motor 60 is rotated in a reverse direction, the outer box frame 28 is moved in the left-hand direction as viewed in FIG. 4. When the width direction sensor 56 detects the position setting mark 14b, the second controlling motor 60 is once stopped and this stop position is regarded as a reference position. Thereafter, the second controlling motor 60 is further rotated by a preset rotational angle from the reference position, and an image or pattern on the transfer film 14 is positioned at a regular position in the width direction.

Operation of the transferring and molding apparatus 10 thus constructed will be described below.

During an injection molding process the supply drum 32 is rotated such that the transfer film 14 is taken out by the length of one shot to be used at the following injection molding process. When the mold 16 is open to separate the stationary and movable mold members 18, 20, the first controlling motor 50c is rotated at a high speed until immediately before the amount of the transfer film 14 being fed reaches a predetermined value and thereafter the first controlling motor 50c is switched to and rotated at a low speed. Thereby, the post-transfer film 14 between the stationary mold member 18 and the movable mold member 20 from a previous injection molding process is drawn out and the pre-transfer film 14 is introduced between two members 18, 20, while the elongate transfer film 14 is being taken up by the take-up drum 46. Then the longitudinal direction sensor 54 detects the position setting mark 14a, the first controlling motor 50c is once stopped and this stop position is regarded as a reference position. At this time, the first controlling motor 50c is stopped from a low speed, to thus prevent overrun from occurring. Thereafter, the first controlling motor 50c is further rotated by a preset rotational angle from the reference position, and an image or a pattern on the transfer film 14 is positioned at the regular position in a longitudinal direction. After the transfer film 14 is stopped at the reference position, the amount of film fed from the reference position to the regular position depends on the rotational angle of the first controlling motor 50c. In case of a pulse motor, since the rotational angle of the first controlling motor 50c depends on a preset pulse rate, the feed amount can be freely and easily adjusted in the range of small value and large value. The positioning in the width direction of the transfer film 14 is carried out in the same manner as positioning in the longitudinal direction.

Accordingly, when a different manufacturing lot of the transfer film 14 is employed upon replacement of the supply drum 32, or the molded article is changed, positioning is required in some cases. In such cases, the positioning is effected only by adjusting a preset rotational angle of the first controlling motor 50c, without moving the sensor position, in accordance with trials. Therefore, the adjustment operation is simple and is completed in a short time, and positional accuracy is highly increased. In case of a pulse motor, positioning is effected only by adjusting the pulse rate of the motor.

Since the film feeding mechanism 22 is integrally directly fixed to the movable mold member 20, tolerance in assembling the components such as eccentricity of axis in a film feeding direction relative to an article molding portion of the movable mold member 20 becomes simple, to thereby reduce cumulative tolerances and facilitate assembling of the components due to decreasing precision control of assembly.

According to a first embodiment of the present invention, as described above in detail, when the mold is open to separate the stationary and movable mold members, the first controlling motor is rotated at a high speed until immediately before the amount of the transfer film being fed reaches a predetermined value and thereafter the first controlling motor is switched to and rotated at a low speed. Meanwhile the transfer film is fed from the feed-out mechanism to the take-up mechanism. When the longitudinal direction sensor detects the position setting mark, the first controlling motor is once stopped and this stop position is regarded as a reference position. Thereafter, the controlling motor is further rotated by a preset rotational angle from the reference position, and an image or a pattern on the transfer film is positioned at the regular position in a longitudinal direction.

With the above described construction, the following effects are attainable.

(1) After the transfer film is stopped at the reference position, the amount of film to be fed from the reference position to the regular position depends on the rotational angle of the first controlling motor. Therefore, the feed amount can be freely, easily and accurately adjusted in the range of a small value and a large value.

(2) Accordingly, when a different manufacturing lot of the transfer film is used upon replacing the supply drum, or the article to be molded is changed, positioning is required in some cases. In such cases, the positioning is effected only by adjusting a preset rotational angle of the first controlling motor, without moving the sensor position, in accordance with trials. Therefore, the adjustment operation is simple and is completed in a short time, and positional accuracy is highly increased.

A transferring and molding apparatus according to a second embodiment of the present invention will be described below with reference to FIGS. 5 through 12(B). The second embodiment pertains to an improvement of the foregoing embodiment with respect to holding a transfer film on a movable member.

As shown in FIGS. 5 through 7(B), first engaging means 64, are provided at a separating surface 62 positioned adjacent to the outer periphery of the article molding portions S on the movable member 20, at positions on the upstream and downstream sides of the feeding path of the transfer film 14. The first engaging means 64 serve as means for pressing the transfer film 14 against the seperating surface 62 and holding the transfer film 14 when the mold is closed, and for enabling the transfer film 14 to detach from the molded article when the mold is opened.

Figure 8A:
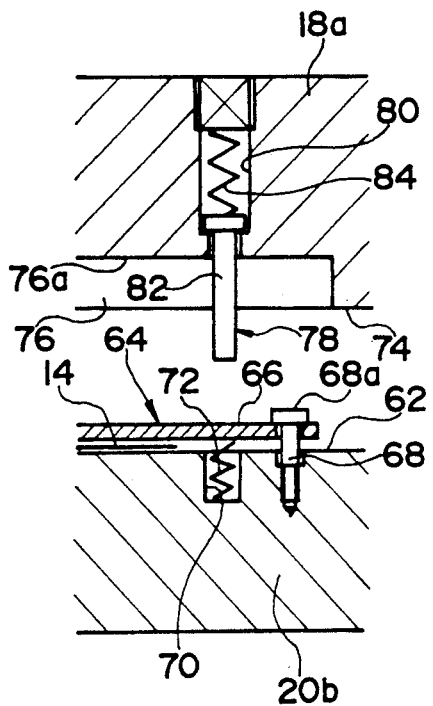
FIGS. 8 (A) through 8 (C) are cross-sectional views taken along line VIII—VIII of FIG. 6 and showing operation of engaging means and pressing means, and also showing the stationary mold member corresponding to the movable mold member.
Figure 8B:
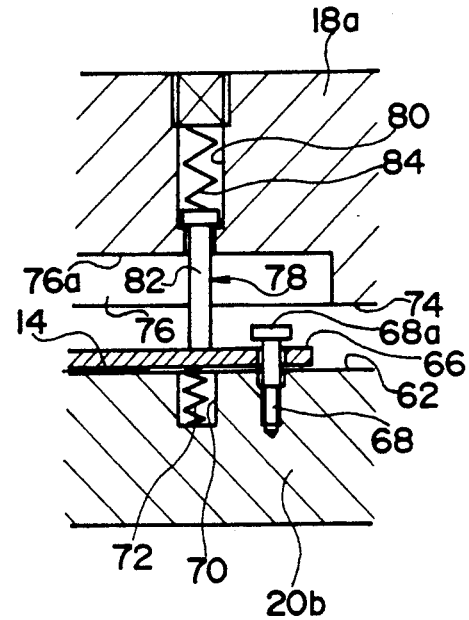
Figure 8C:
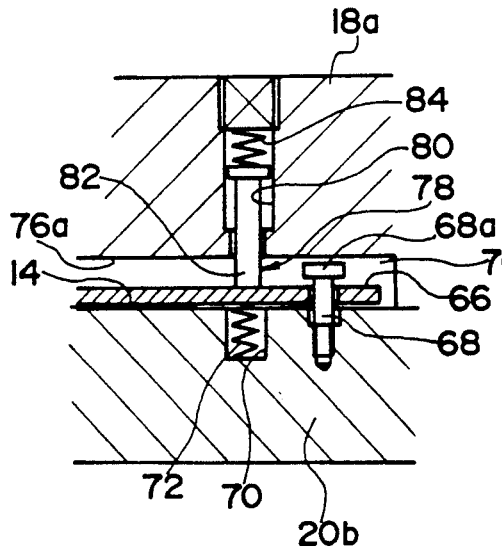

As shown in FIGS. 8(A)-8(C), each first engaging means 64 includes an engaging plate 66 which is longer than the width of the transfer film 14, engaging pins 68 (only the righthand one is shown in FIGS. 8(A)-8(C)) which pass through opposite end portions of the engaging plate 66, are threaded into mold body 20b of the movable mold member 20 and extend vertically to the separating surface 62. The engaging plate 66 is movable toward and away from the separating surface 62 in parallel therewith while being guided by engaging pins 68. Each engaging pin 68 is formed with a head 68a having a large diameter for preventing the engaging plate 66 from being removed therefrom. Futher, return springs 72 are provided adjacent to the engaging pins 68 and in recesses 70 formed on the mold body 20b for urging the engaging surface 66 to move away from the separating plate 62.

On the other hand, a mold body 18a of the stationary mold member 18 is formed with a slot 76 for accommodating the engaging plate 66 and the engaging pins 68 when the mold 16 is closed. The slot 76 has therein pressing means 78 for contacting the engaging plate 66 and pressing the engaging plate 66 against the separating surface 62 of the movable mold member 20.

The pressing means 78 is provided in confrontation with the return spring 72. The pressing means 78 comprises a cylindrical bore 80 formed in the mold body 18a in a direction parallel to the moving direction of the movable mold member 20 and opening onto a bottom surface 76a of the slot 76, a rod 82 slidably inserted in the bore 80, and a main spring 84 inserted in the bore 80 for urging the rod 82 toward the movable mold member 20. The urging force of the main spring 84 is arranged to be larger than that of the return spring 72. Therefore, when the tip end of the rod 82 contacts the engaging plate 66 upon closing the mold 16, the engaging plate 66 first is moved to contact the separating surface 62 of the movable mold member 20 with the return spring 72 being compressed, thereafter the main spring 84 is gradually compressed, and the rod 82 gradually is pushed further into the bore 80. The urging force of the main spring 84 is also arranged to be of a value so that the pressing force of the engaging plate 66 does not prevent the transfer film 14 from being pulled into the article molding portions when the mold is closed.

Figure 6:
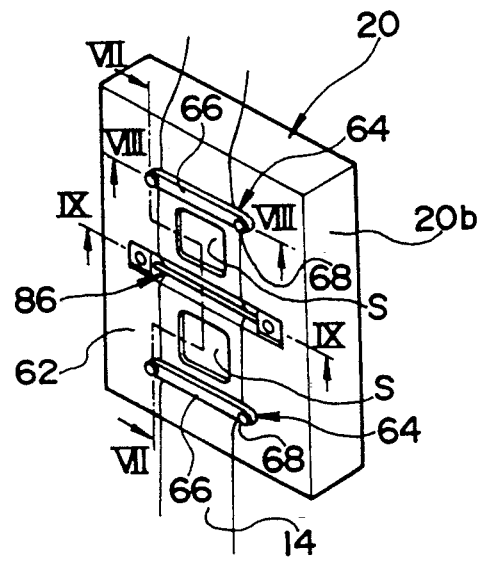
FIG. 6 is a perspective view showing an article molding portion of the movable mold member in the second embodiment.
Figure 7A:
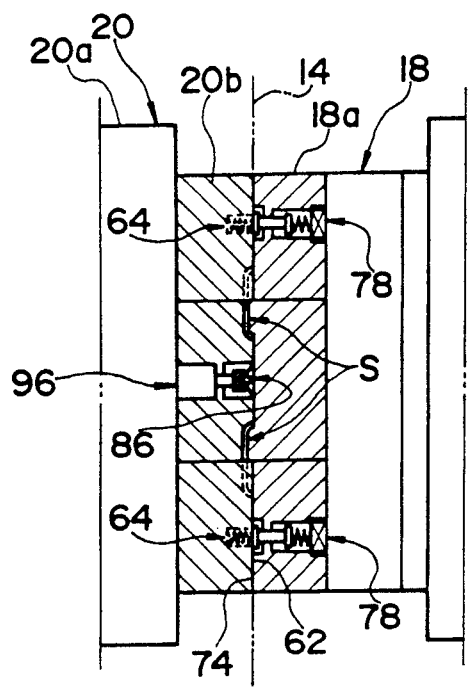
FIGS. 7(A) and 7(B) are cross-sectional view taken along line VII—VII of FIG. 6, also showing a stationary mold member corresponding to the movable mold member, FIG. 7 (A) showing closing of the mold, and FIG. 7 (B) showing opening of the mold.
Figure 7B:
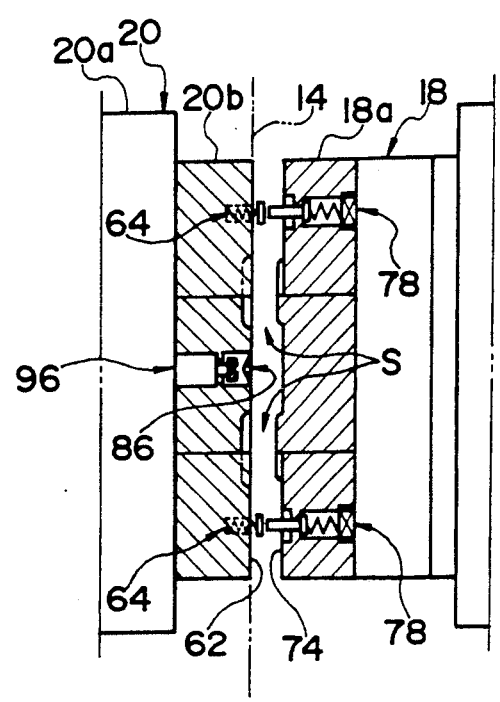
Figure 9:
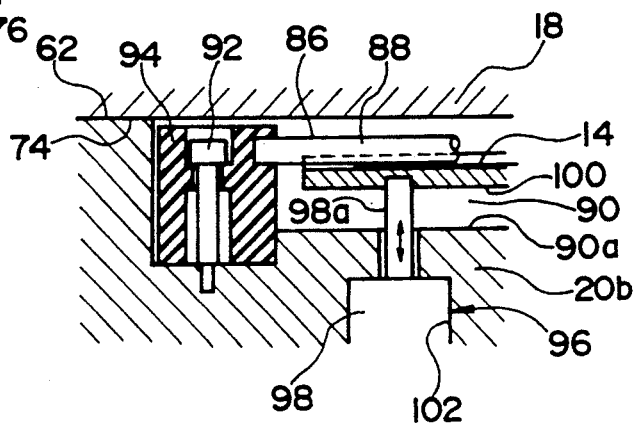
FIG. 9 is a cross-sectional view taken along line IX—IX of FIG. 6 and showing operation of engaging means and pressing means, and also showing the stationary mold member corresponding to the movable mold member.

In this embodiment, as shown in FIGS. 6 and 7(B), there are two article molding portions S defined by the stationary and movable mold members 18, 20, that is, the mold 16 is of the multiple manufacturing type. Between the two article molding portions S, there is provided on the movable mold member 20 a second engaging means 86 for engaging with the transfer film 14 and detaching the transfer film 14 from the molded article smoothly. The second engaging means 86 comprises a bar member 88 (FIG. 9), having a circular section, which is longer than the width of the transfer film 14 and positioned in a slot 90 formed in the separating surface 62 between the article molding portions S. The bar member 88 has opposite end portions fixedly supported on brackets 94 (only the lefthand one is shown in FIG. 9) which are fastened to the mold body 20b through bolts 92 as shown in FIG. 9. The transfer film 14 is located in the slots 90 and is engaged with the bar member 88. The position of the bar member 88 can be varied by adjusting thickness of the brackets 94, to thereby adjust the length of the transfer film 14 pulled into the slot 90 and to cancel errors of the pitch between images or patterns and the pitch between two article molding portions S.

Further, fixing means 96 is provided in the slot 90 so that it may be advanced or retracted from a bottom surface 90a to fix the position of the transfer film 14. The fixing means 96 comprises a hydraulic cylinder 98 disposed in a recess 102 formed in the mold body 20b of the movable mold member 20, and a pressing plate 100 attached to and actuating rod 98a of the hydraulic cylinder 98. The actuating rod 98a passes through the mold body 20b and projects into the slit 90. When the hydraulic cylinder 98 is actuated to advance the actuating rod 98a, the pressing plate 100 is advanced and presses the transfer film 14 against the bar member 88 to fix the position thereof firmly.

Operation of the transferring and molding apparatus 10 thus constructed will be described below.

During each molding cycle, the transfer film 14 is taken out from the supply drum 32 by the length of one shot, fed between the stationary and movable mold member 18, 20 by the longitudinal direction feed means 50, and positioned at a regular position. At that time, the transfer film 14 passing between the stationary and movable mold members 18, 20 is tensioned by the tension roller 36b at the feed-out side and the tension roller 44a at the take-up side.

After the transfer film 14 is fed and positioned by the longitudinal direction feeding means 50, the hydraulic cylinder 98 of the film fixing means 96 is actuated, the transfer film 14 is nipped between the pressing plate 100 and the bar member 88 as shown in FIG. 9. From this state, the movable mold member 20 is moved toward the stationary mold member 18, and closing of the mold 16 is started.

Meanwhile, the engaging plates 66 of the first engaging means contact the rod members 82 of the pressing means 78, and the engaging plates 66 are pressed against the separating surface 62 against urging force of the return springs 72. When the movable mold member 20 is further moved closer to the stationary mold member 18, the rods 82 gradually enter into the inner part of the bores 80 against urging force of the main springs 84. Further, movement of the movable mold member 20 causes the movable and stationary mold members 18, 20 to be closed completely, whereby closing of the mold 16 is finished as shown in FIG. 8(C).

As molding convex portion of the stationary mold member 18 constituting a male mold is inserted into a molding concave portion of the movable mold member 20 constituting a female mold, with a portion of the transfer film 14 being fixed by the fixing means 96, transfer film portions 14 positioned at upstream and downstream sides of such fixed portion are gradually pulled into the article molding portions S from the other free ends thereof in a manner such that the free transfer film portions positioned at upstream and downstream sides of the fixed portion are slidingly moved toward the fixed portion. At this time, the engaging plates 66 for pressing the transfer film 14 against the separating surface 62 allow the transfer film 14 to move slidingly, and the tension acting on the transfer film 14 is maintained at a uniform value by the tension rollers 36b, 44a acting on the film at positions upstream and downstream of the fixed portion thereof.

Therefore, excess tension is not imported to the transfer film 14, and thus the transfer film 14 is not deformed. Further, the image or pattern on the transfer film 14 can be precisely positioned at a regular position in the article molding portions S, to thus prevent the image or pattern on the molded article from being distorted. Even if the shapes of two upper and lower article molding portions S are different, the images or patterns on the transfer film 14 can be precisely positioned at respective regular positions.

Incidentally, in this embodiment, since two upper and lower article molding portions S have the same shapes, when the mold is closed the transfer film 14 can be precisely positioned at a regular position in the upper and lower article molding portions S by being pulled equally thereinto from upstream and downstream sides thereof without the need for fixing the transfer film 14 firmly by the fixing means 96.

On the other hand, after the mold is closed completely, melted resin is injected into the article molding portions S from the stationary mold member 18, and at the same time the images or patterns on the transfer film are transferred onto the molded articles.

Thereafter, opening of the mold is started, and the molded articles are removed from the movable mold member 20. At that time, though the transfer film 14 adheres to the surface of the molded article remaining in the stationary mold member 18, the transfer film 14 is engaged by the two engaging plates 66 and the bar member 88 and thus is held thereby, and smoothly detached from the surface of the molded article as the movable mold member 20 is moved away from the stationary mold member 20.

FIGS. 10 through 12(B) illustrate a modified arrangement of the engaging means and fixing means.

In this arrangement, an engaging means 104 has a bar member 106 supported by brackets 108 each of which is slidably supported by a fastening bolt 110 and urged by a spring 112 toward the stationary mold member 18. The bar member 106 is arranged so as to be spaced from the separating surface 62 of the movable mold member 20 with the opening of the mold.

On the other hand, the stationary mold member 18 is formed with a slot 114 for accommodating the brackets 108 and the bar member 106. Projecting members 116 are provided in the slot 114 to contact the other ends of the brackets 108 and to push the brackets 108 toward the movable mold member 20. The fixing means 96 is structurally and functionally identical to that shown in FIGS. 5 through 9. Errors of pitch between images or patterns and the pitch between two article molding portions can be obviated by adjusting the thickness of the projecting members 116.

Accordingly, in this modified arrangement, since the bar member 106 is spaced from the separating surface 62 with the opening of the mold, the transfer film 14 can be easily inserted and positioned between the bar member 106 and the separating surface 62, and can be fed with decreased feed resistance.

In the embodiment as shown in FIGS. 5 through 12B, the transferring and molding apparatus has a plurality of article molding portions S. However, in the case of a transferring and molding apparatus which does not have engaging means and fixing means, the present invention is applicable to an apparatus having a single article molding portion. In such apparatus, when the mold is closed the transfer film is equally pulled into the single article molding portion from upstream and downstream sides in the film feeding path.

According to the transferring and molding apparatus of the second embodiment, the following effects are attainable.

(1) The transferring and molding apparatus includes first engaging means provided on a separating surface of the movable member and positioned above the transfer film path and adjacent to an article molding portion for nipping the transfer film in cooperation with the separating surface when closing the mold, and for holding the transfer film on the movalbe member when opening the mold. The first engaging means is movable toward and away from the separating surface so as to engage with the transfer film. Pressing means is provided on the stationary mold member for contacting the engaging means and pressing the engaging means against the separating surface while the mold is being closed, and for allowing the transfer film to slide in the article molding portion when closing the mold. With this structure, excess tension does not act on the transfer film, and thus the transfer film is not deformed. Further, the image or pattern on the transfer film can be precisely positioned at a regular position in the article molding portions, and thus the image or pattern on the molded article is not distorted.

Further, when the molded article is removed, since the transfer film is engaged and held by first engaging means, the transfer film can be smoothly detached from the surface of the molded article.

(2) Further, the transferring and molding apparatus includes second engaging means provided between the article molding portions of the movable mold member for holding the transfer film on the movable member when opening the mold, and fixing means provided on the movable mold member for fixing the transfer film in cooperation with the second engaging means, the fixing means being movable toward and away from the second engaging means. With this structure, when the transfer film is pulled into the article molding portion upon the closing of the mold, the transfer film is fixed at a fixed portion and transfer film portions positioned at upstream and downstreamn sides of the fixed portion are slidingly moved toward the fixed portion. Therefore, the images or patterns on the transfer film can be precisely positioned at regular positions in respective corresponding article molding portions. This positioning feature is effectively applicable to multiple manufacturing type apparatus which can mold different shaped molded articles simultaneously.

Although certain preferred embodiments have been shown and described, it should be understood that many changes and modifications may be made thereto without departing from the scope of the appended claims.

What is claimed is:

1. In a transferring and molding apparatus for transferring an image or pattern on an elongate transfer film to a molded article by introducing the transfer film between a stationary mold member and a movable mold member of a mold and holding the transfer film between the stationary and movable mold members simultaneously with an injection molding operation, the improvement wherein said transferring and molding apparatus comprises:

a film feed-out mechanism provided at an upstream side of said mold in a film feed direction for feeding transfer film from a supply drum and for introducing said transfer film between said stationary mold member and said movable mold member;

a film take-up mechanism provided at a downstream side of said mold in the film feeding direction for taking up said transfer film positioned between said stationary mold member and said movable mold member onto a take-up drum;

longitudinal direction feeding means for feeding said transfer film in a longitudinal direction thereof from said film feed-out mechanism toward said film take-up mechanism by a predetermined length during each molding cycle, said longitudinal direction feeding means having a first controlling motor;

frame means comprising an inner frame supporting said movable mold member, and an outer frame enclosing said inner frame and supporting said film feed-out mechanism and said film take-up mechanism;

width direction position adjusting means, operatively connected to said inner and outer frames, for adjusting the position of said transfer film in the width direction thereof by changing the relative positions of said inner and outer frames in said width direction, said width direction position adjusting means including a second controlling motor;

a longitudinal direction sensor for detecting a first position setting mark on said transfer film;

a width direction sensor for detecting a second position setting mark on said transfer film;

first control means for, when said mold is open with said stationary and movable mold members separated, rotating said first controlling motor at a high speed until immediately before an amount of the transfer film being fed reaches a predetermined value and thereafter rotating said first controlling motor at a low speed, then when said longitudinal direction sensor detects the first position setting mark, once stopping said first controlling motor, and thereafter further rotating said first controlling motor by a preset rotational angle; and second control means for, after the rotation of said first controlling motor is completed, rotating said second controlling motor to move said outer frame relative to said inner frame in such a manner that said second controlling motor is stopped when said width direction sensor detects the second position setting mark, and thereafter is further rotated by a preset rotational angle.

2. The improvement according to claim 1, wherein said first controlling motor comprises one of a pulse motor or a servo motor.

3. The improvement according to claim 1, further comprising:

first engaging means, provided on a separating surface of said movable member and positioned spaced from the path of said transfer film and adjacent to an article molding portion of said mold, for nipping said transfer film in cooperation with said separating surface when closing said mold, and for holding said transfer film on said movable member when opening said mold, said first engaging means being movable toward and away from said separating surface so as to engage with said transfer film; and pressing means provided on said stationary mold member for contacting said first engaging means and pressing said first engaging means against said separating surface while said mold is being closed, and for allowing said transfer film to slide in said article molding portion when closing said mold.

4. The improvement according to claim 3, wherein said first engaging means comprises an engaging plate and at least one pin for movably holding said engaging plate.

5. The improvement according to claim 3, wherein said pressing means comprises a rod capable of advancing and retracting, and a spring for urging said rod toward said engaging means.

6. The improvement according to claim 3, further comprising second engaging means provided between plural article molding portions of said movable mold member for holding said transfer film on said movable member when opening said mold.

7. The improvement according to claim 6, wherein said second engaging means comprises a bar member for engaging with said transfer film and urging means for urging said bar member in a direction apart from said movable mold member.

8. The improvement according to claim 6, further comprising fixing means provided on said movable mold member for fixing the position of said transfer film in cooperation with said second engaging means, said fixing means being movable toward and away from said second engaging means so as to contact said second engaging means.

9. A transferring apparatus, for use with a mold including stationary and movable mold members defining a mold cavity, for transferring an image of pattern on an elongate transfer film to a molded article by introducing the transfer film between the stationary mold member and the movable mold member and holding the transfer film between the stationary and movable mold members simultaneously with injection molding operation of the mold, the transferring apparatus comprising:

a film feed-out mechanism positionable at an upstream side of a mold in a film feed direction for feeding transfer film from a supply drum and for introducing the transfer film between stationary and movable mold members of the mold;

a film take-up mechanism positionable at a downstream side of the mold in the film feeding direction for taking up the transfer film positioned between the stationary and movable mold members onto a take-up drum;

longitudinal direction feeding means for feeding the transfer film in a longitudinal direction thereof from said film feed-out mechanism toward said film take-up mechanism by a predetermined length during each molding cycle of the mold, said longitudinal direction feeding means including a first controlling motor;

frame means comprising an inner frame for supporting the movable mold member, and an outer frame enclosing said inner frame and supporting said film feed-out mechanism and said film take-up mechanism;

width direction position adjusting means, operatively connected to said inner and outer frames for adjusting the position of the transfer film in the width direction thereof by changing the relative positions of said inner and outer frames in the width direction, said width direction position adjusting means including a second controlling motor;

a longitudinal direction sensor for detecting a first position setting mark on the transfer film;

a width direction sensor for detecting a second position setting mark on the transfer film;

first control means for, when the mold is open with the stationary and movable mold members separated, rotating said first controlling motor at a high speed until immediately before an amount of the transfer film being fed reaches a predetermined value and thereafter rotating said first controlling motor at a low speed, then when said longitudinal direction sensor detects the first position setting mark, once stopping said first controlling motor, and thereafter further rotating said first controlling motor by a preset rotational angle; and second control means for, after the rotation of said first controlling motor is completed, rotating said second controlling motor to move said outer frame relative to said inner frame in such a manner that said second controlling motor is stopped when said width direction sensor detects the second position setting mark, and thereafter is further rotated by a preset rotational angle.

10. A transferring apparatus according to claim 9, wherein said first controlling motor comprises one of a pulse motor or a servo motor.

11. A transferring apparatus according to claim 9, further comprising:

first engaging means, positionable on a separating surface of the movable mold member at a location spaced from the path of the transfer film and adjacent to an article molding portion of the mold, for holding the transfer film on the movable mold member when opening the mold, said first engaging means being adapted to be movable toward and away from the separating surface so as to engage with the transfer film; and pressing means, positionable on the stationary mold member, for contacting said first engaging means and for pressing said first engaging means against the separating surface while the mold is being closed, and for allowing the transfer film to slide in the article molding portion during closing of the mold.

12. A transferring apparatus according to claim 11, wherein said first engaging means comprises an engaging plate and at least one pin for movably holding said engaging plate.

13. A transferring apparatus according to claim 11, wherein said pressing means comprises at least one rod capable of advancing and retracting, and a spring for urging said rod toward said engaging means.

14. A transferring apparatus according to claim 11, further comprising second engaging means, positionable between plural article molding portions of the movable mold member, for holding the transfer film on the movable member when opening the mold.

15. A transferring apparatus according to claim 14, wherein said second engaging means comprises a bar member for engaging with the transfer film and urging means for urging said bar member in a direction to be away from the movable mold member.

16. A transferring apparatus according to claim 14, further comprising fixing means, positionable on the movable mold member, for fixing the position of the transfer film in cooperation with said second engaging means, said fixing means being movable toward and away from said second engaging means so as to contact said second engaging means.

* * * * *